United States Patent
Conger

[15] 3,648,209
[45] Mar. 7, 1972

[54] INDUCTANCE DEVICE WITH VACUUM INSULATION

[72] Inventor: Channing C. Conger, Olmsted Falls, Ohio
[73] Assignee: The United States of America as represented by the Administrator of National Aeronautics and Space Administration
[22] Filed: Jan. 28, 1971
[21] Appl. No.: 110,402

[52] U.S. Cl. ................336/220, 336/60, 336/198
[51] Int. Cl. ......................................H01f 27/32
[58] Field of Search ...............336/60, 198, 220, 208

[56] References Cited

UNITED STATES PATENTS

| 2,140,552 | 12/1938 | Rypinski | 336/60 |
| 2,375,309 | 5/1945 | McCoy | 336/208 |

*Primary Examiner*—E. A. Goldberg
*Attorney*—N. T. Musial, G. E. Shook and John R. Manning

[57] ABSTRACT

Electromagnetic components for use in space are made of materials of low gas entrapping capability. The electromagnetic components also includes electrical winding. The windings are loosely wound to provide adequate vent paths to the surface of the windings. The vacuum of space is utilized for insulation.

5 Claims, 2 Drawing Figures

PATENTED MAR 7 1972

3,648,209

INVENTOR
CHANNING C. CONGER

BY Norman T. Musial
Gene E. Shook
ATTORNEYS

INDUCTANCE DEVICE WITH VACUUM INSULATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with providing highly reliable electromagnetic components having long life for use in space. The invention is particularly directed to the utilization of vacuum insulation for transformers, inductors, magnetic amplifiers and any other device utilizing a magnetic core material whereon windings are placed.

Conventional electromagnetic components utilize various potting and void-filling compounds to conduct heat and provide mechanical stability. Many times hermetic sealing is relied on to maintain pressure.

Problems have been encountered when such components are used in space. The potting and void-filling compounds usually trap or produce gases. These gases provide paths which enable arcs to occur during subsequent use of the devices. In particular, small gas-filled voids are subject to numerous breakdown mechanism when exposed to high electric fields resulting in progressive failure of the insulating medium with time.

SUMMARY OF THE INVENTION

These problems have been precluded in electromagnetic components constructed in accordance with the present invention. The components are constructed to take advantage of the inherent dielectric strength of space vacuum and avoid problems resulting from outgassing of encapsulating compounds. These electromagnetic components are of an open construction and utilize the vacuum of space for insulation. A necessary and vital element in such construction is to provide adequate vent paths throughout the electrical windings and supports and to provide high emittance surfaces for improved heat transfer by radiation.

OBJECTS OF THE INVENTION

It is, therefore, an object of the present invention to provide highly reliable electromagnetic components for use in space.

Another object of the invention is to provide electromagnetic components having long life with provisions for the rapid venting of entrapped gases from electrical windings and mechanical supports.

A further object of the invention is to provide electromagnetic devices which become more reliable as the devices are used in space in that the most probable failure mechanism, ionization of trapped gases, has been eliminated.

These and other objects of the invention will be apparent from the specification which follows and from the drawing wherein like numerals are used throughout to identify like parts.

DESCRIPTION OF THE DRAWING

FIG. 1 is a perspective view with parts broken away of an electromagnetic component constructed in accordance with the invention. A transformer is shown to explain the invention. Application to other electromagnetic devices is very similar.

DESCRIPTION OF THE PREFERRED EMBODIMENT

Figure 1:
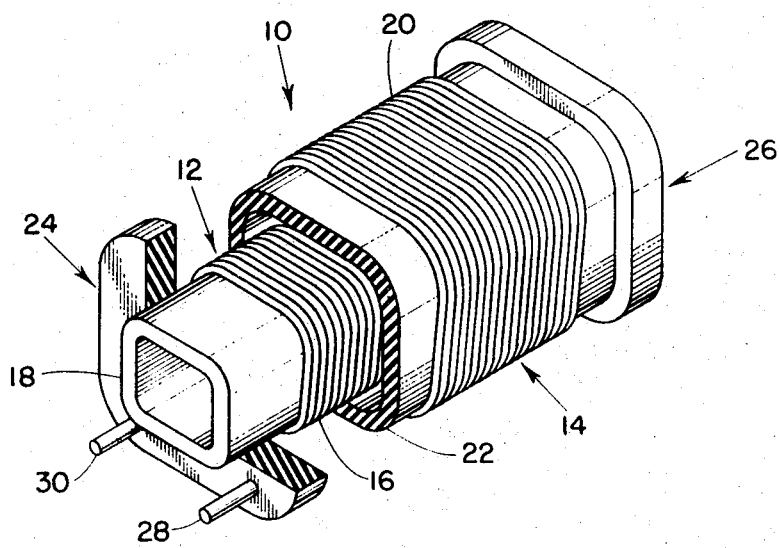

Referring now to the drawing there is shown an electromagnetic component 10 for use in a space environment. The structural features embodied in this component 10 may be incorporated into various electromagnetic devices, such as motors, transformers, inductances, RF transformers, relays, solenoids, generators, or magnetic amplifiers.

As shown in the drawing, these magnetic components utilize an open construction which takes advantage of the inherent dielectric strength of space vacuum. The space vacuum provides a predictable and stable operating environment independent of the mission duration. This type of open construction also avoids problems resulting from the outgassing of encapsulating compounds.

Figure 2:
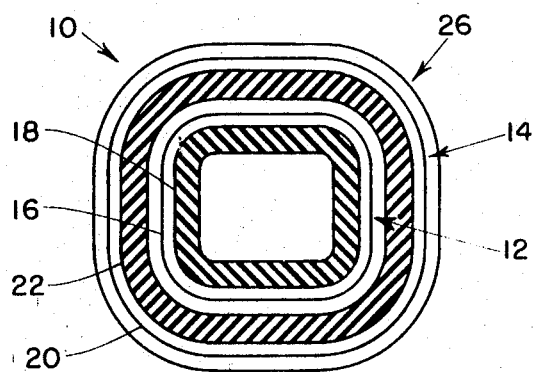
FIG. 2 is a vertical half section view of the component shown in FIG. 1.

The electromagnetic component illustrated in FIGS. 1 and 2 has an inner coil 12 mounted in an outer coil 14. This structure is used for a high-voltage power transformer.

The component 10 is of a bobbin-type construction having layer wound coils. The inner coil 12 is formed by winding magnet wires 16 on a bobbin 18. The outer coil 14 similarly comprises wires 20 wound on a bobbin 22.

The bobbins 18 and 22 are constructed of a material that is capable of being outgassed thoroughly and rapidly by baking and vacuum pumping. The wires 16 and 20 are covered with an insulating material having the preferred characteristics of the insulating material of the bobbins 18 and 22.

Such insulating materials have a low initial volatile content and release rapidly initial volatile matter under high vacuum. These materials also have very low long term outgassing rates, and they must be thermally stable. Materials exhibiting these characteristics are polyimides, aromatic polyimides, and silicon treated mica and mica-glass composites.

Suitable end plates 24 and 26 serve to support the inner coil 12 within the outer coil 14. The wires 16 are spaced inwardly from the inner surface of the bobbin 18. The end plates 24 and 26 also provide a solid barrier at the end of the coils for added voltage protection. Each barrier forms an integral part of the coil tube, and it retains its position under mechanical stresses. The end plates 24 and 26 are of the same material as the bobbins 18 and 22.

A suitable lead 28 is provided in the end plate 14. This lead is connected to the wires 20 in the outer coil 14. A similar lead 30 is likewise connected to the wires 16 in the inner coil 12.

An important feature of the invention is that the coils 12 and 14 are separated in spaced relationship. The vacuum of outer space is utilized as a dielectric material. The wires 16 and 20 are loosely wound on the bobbins 18 and 22 to provide an adequate path for any outgassed materials to reach the vacuum separating the inner and outer coils.

While the preferred structure of the electromagnetic component has been described it will be appreciated that various structural modifications may be made to the invention without departing from the spirit of the invention or the scope of the subjoined claims.

What is claimed is:

1. In electromagnetic components for use in outer space, the improvement comprising
    a first bobbin of an insulating material that is capable of being outgassed thoroughly and rapidly by baking and vacuum pumping,
    first magnet wires carried by said bobbin forming a first coil, said first magnet wires being loosely wound in layers on said first bobbin to provide paths for outgassed materials to reach the outer surface of said first coil,
    a second bobbin of an insulating material that is capable of being outgassed thoroughly and rapidly by baking and vacuum pumping, said second bobbin having a bore for receiving said first bobbin, the inside diameter of said bore being substantially greater than the outside diameter of said first coil, the space between the outer surface of said first coil and the inner surface of said bore of said second bobbin being capable of evacuation by the vacuum of outer space whereby said vacuum is utilized as a dielectric material, and
    second magnet wires carried by said second bobbin forming a second coil, said second magnet wire being loosely wound in layers on said second coil to provide a path for outgassed materials to reach the outer surface of said second coil.

2. Apparatus as claimed in claim 1 wherein said first and second bobbins are made from a material selected from a group consisting of polyimides, aromatic polyimides, and silicon treated mica and mica-glass composites.

3. Apparatus as claimed in claim 1 wherein the first and second magnet wires are covered with an insulating material having a low initial volatile content and which releases rapidly initial volatile matter under high vacuum.

4. Apparatus as claimed in claim 3 wherein the insulating material covering said first and second magnet wires is the same as the material of said first and second bobbin.

5. Apparatus as claimed in claim 1 including a pair of spaced end plates for mounting said first bobbin in said second bobbin, said end plates being of the same insulating material as said bobbins for added voltage protection.

* * * * *